April 14, 1931.          H. J. L. FRANK          1,800,446
AUTOMATIC CONTROL
Filed Oct. 6, 1925          7 Sheets-Sheet 1
Fig. 1.
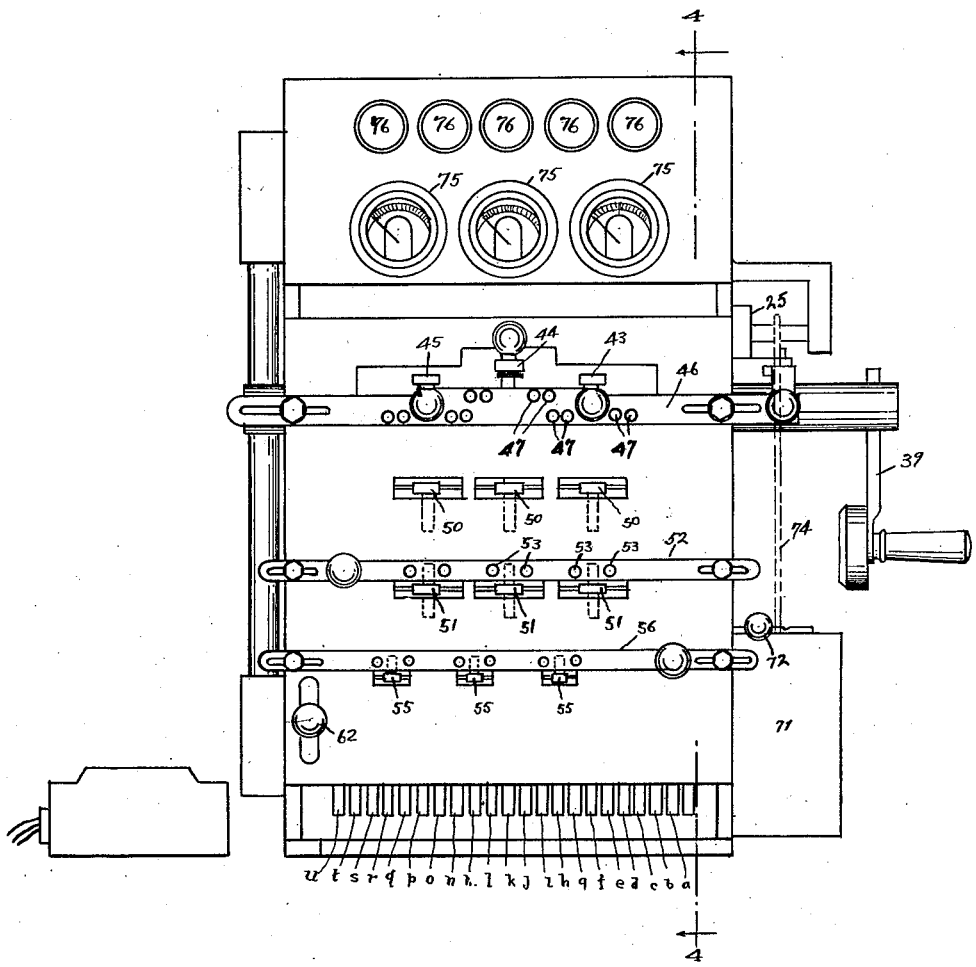
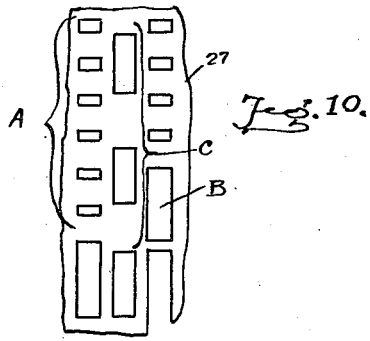
Fig. 10.
INVENTOR
Harrison J. L. Frank
BY
Francis D. Hardesty
ATTORNEY

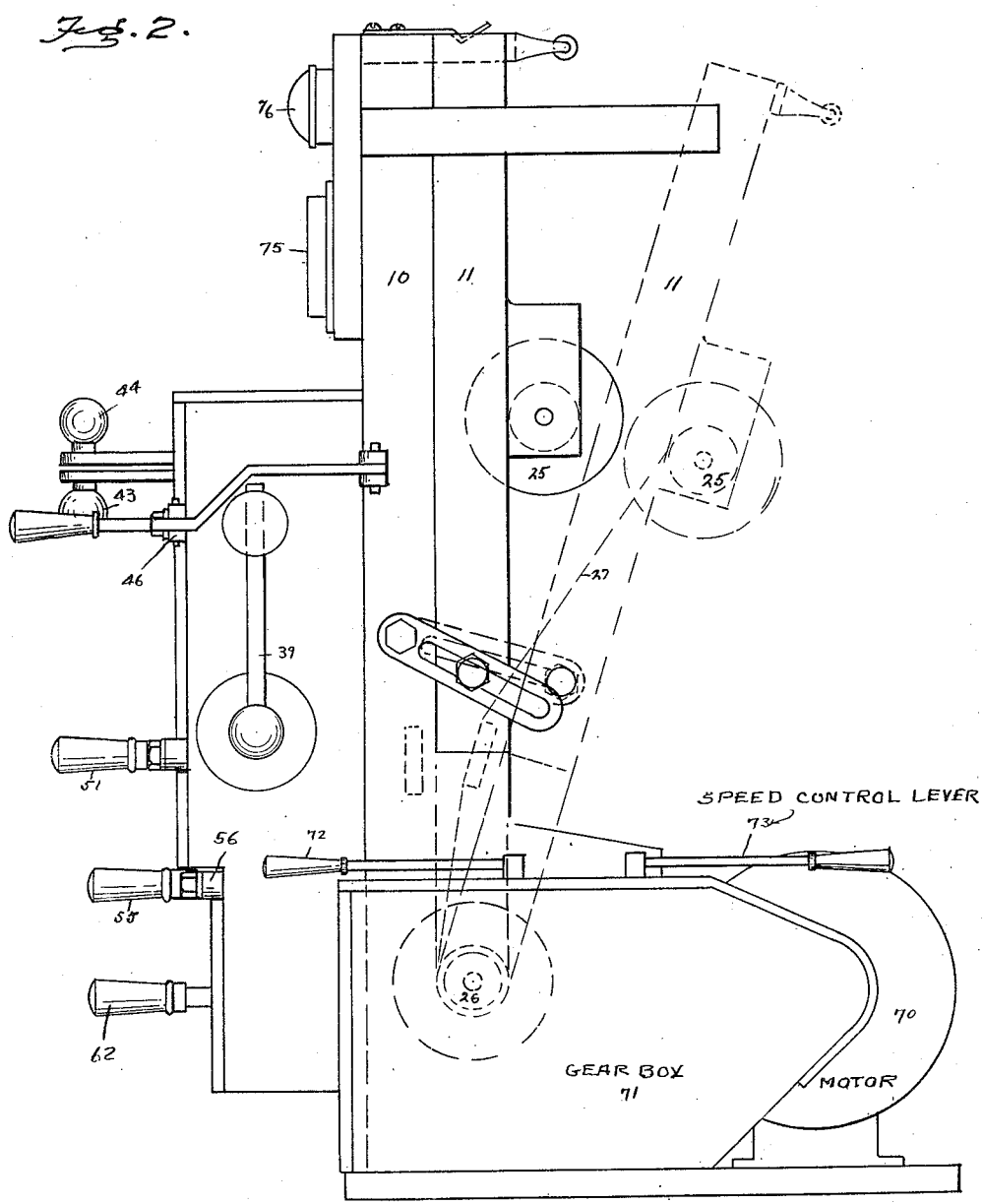

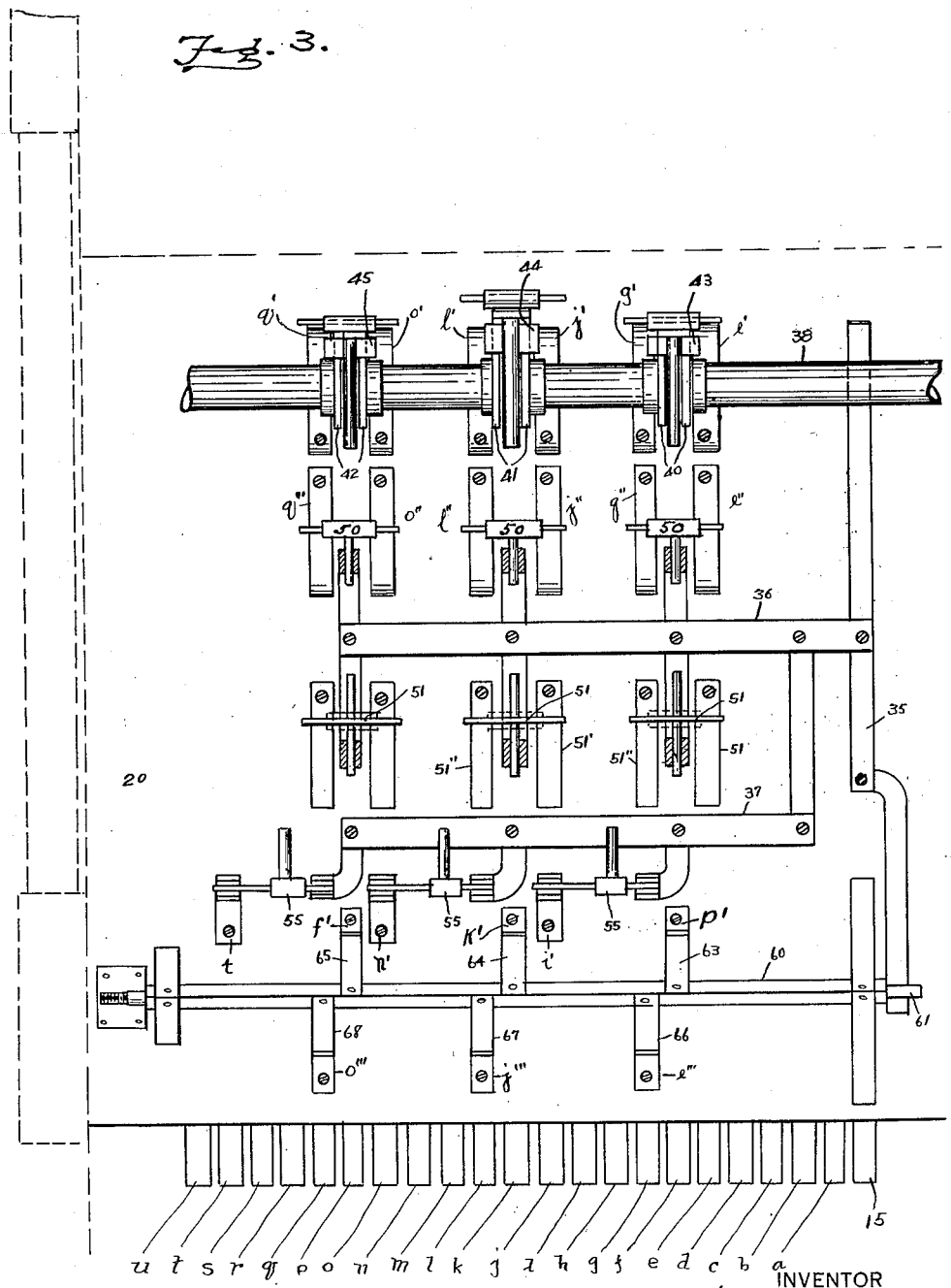

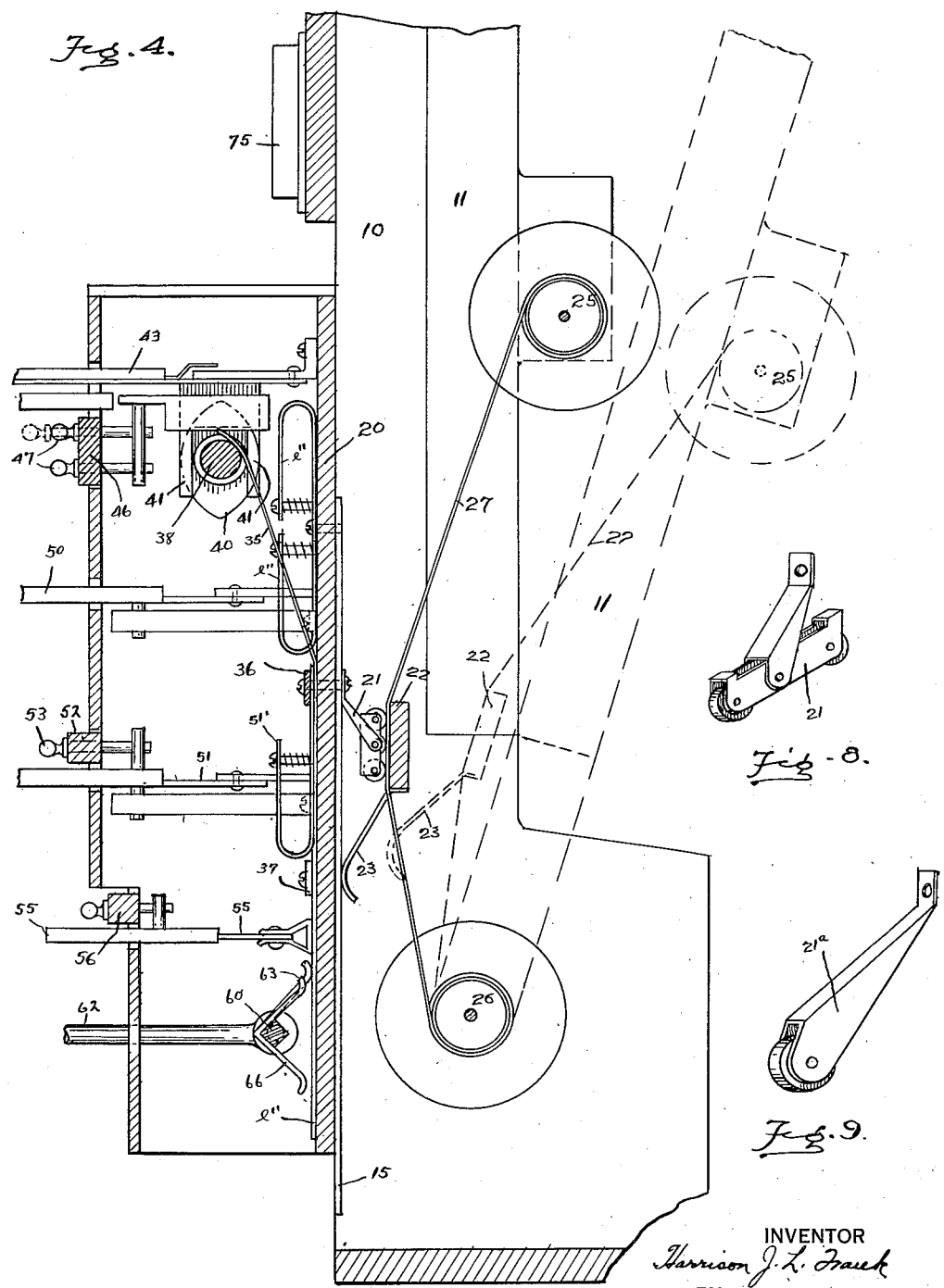

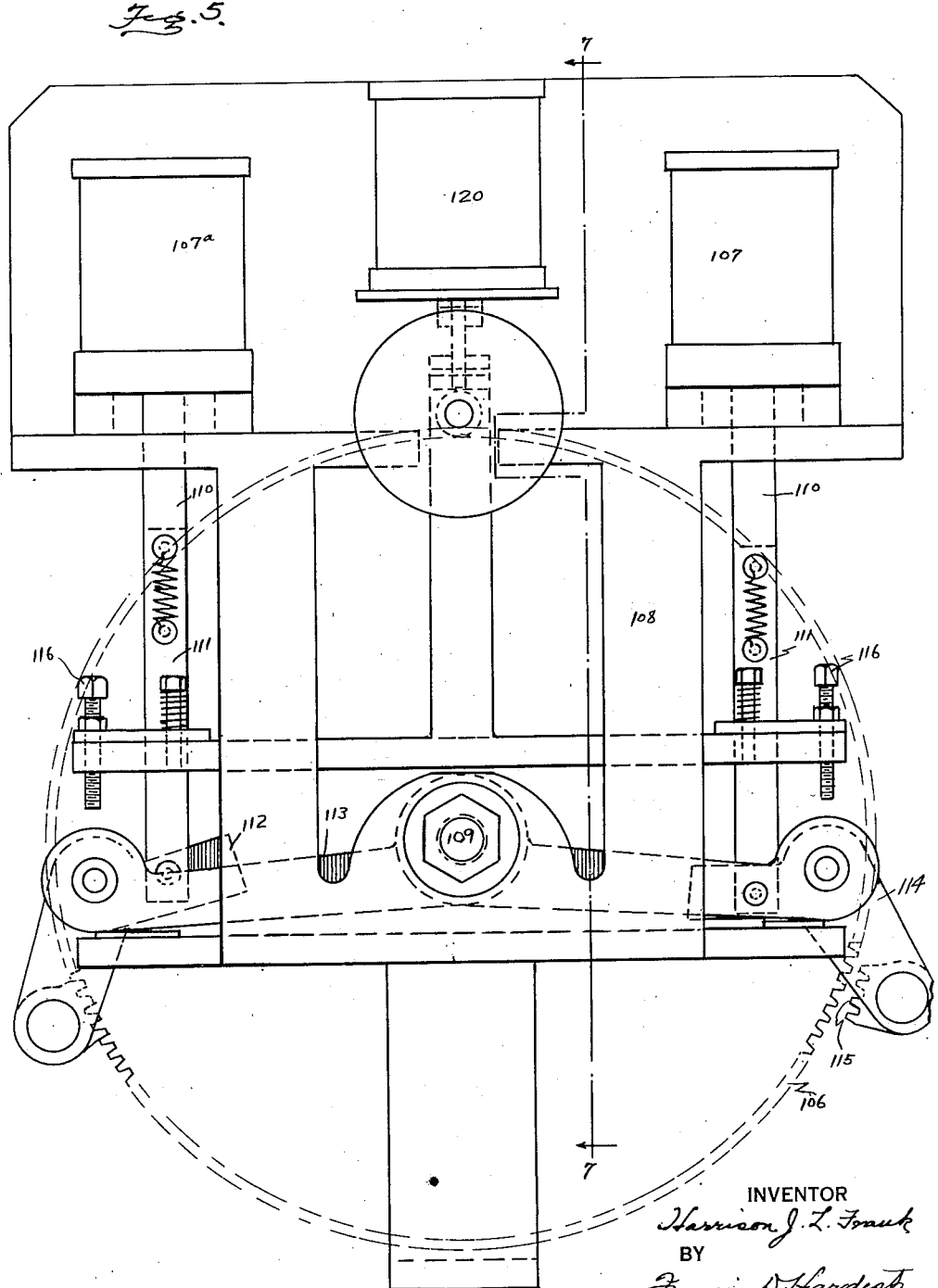

April 14, 1931.                H. J. L. FRANK                1,800,446
                              AUTOMATIC CONTROL
                          Filed Oct, 6, 1925    7 Sheets-Sheet 6
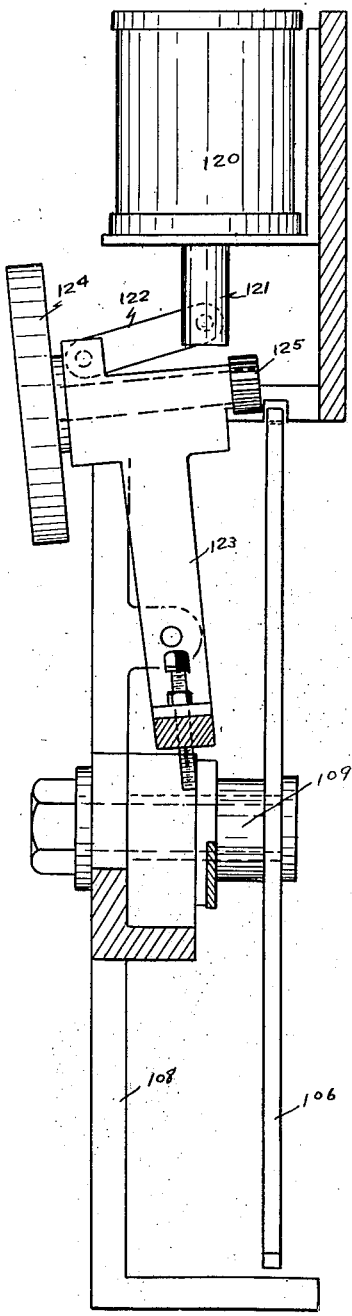
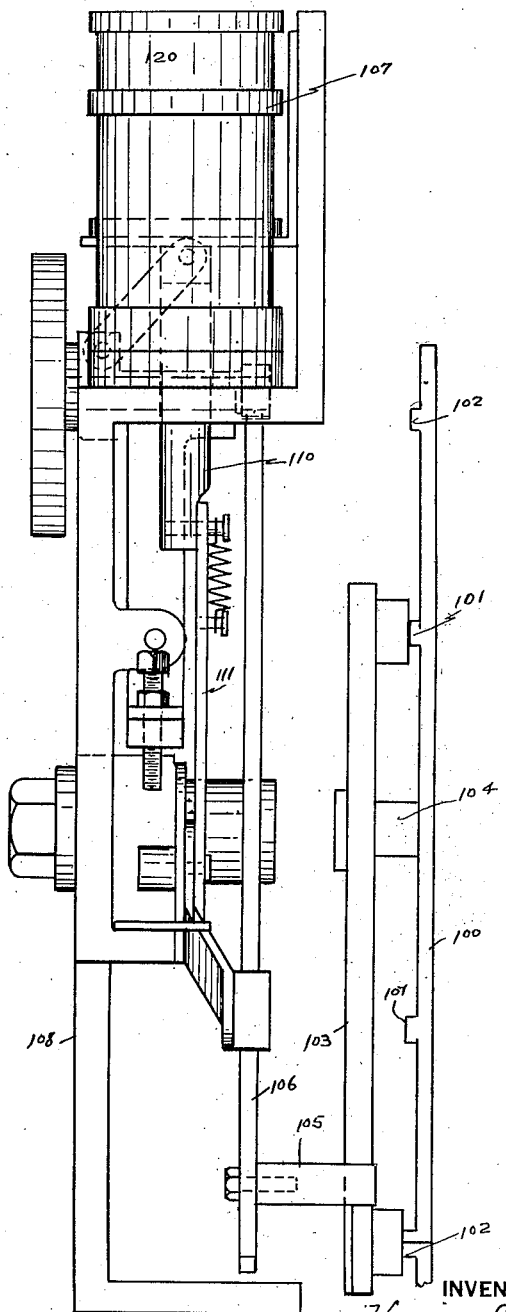
INVENTOR
Harrison J. L. Frank
BY
Francis D. Hardesty
ATTORNEY Patented Apr. 14, 1931

1,800,446

UNITED STATES PATENT OFFICE

HARRISON J. L. FRANK, OF DETROIT, MICHIGAN, ASSIGNOR TO BULLDOG ELECTRIC PRODUCTS COMPANY, OF DETROIT, MICHIGAN, A CORPORATION OF WEST VIRGINIA

AUTOMATIC CONTROL

Application filed October 6, 1925. Serial No. 60,925.

The present invention relates to automatic means for operating a plurality of electrical devices or lights or both and particularly to means for operating theater lights, stage signals, and the like, according to a previously prepared schedule.

Heretofore, in the lighting installation of theaters and the like, the lighting effects have been obtained by the use of hand operated switches, dimmers, and the like, the setting of which requires the constant attention of one or more skilled operatives and the close following of instructions based of course on the score of the performance. Even with the highly skilled electricians usually employed on this work, it is often the case that the lighting effects produced at one performance will not be or cannot be reproduced at the next owing to the human element.

It is among the objects of the present invention to eliminate the human element from the lighting control and operate the various switches, dimmers, signals, etc., automatically, according to a previously prepared record so that a duplication of results may be obtained in succeeding performances, whether the interval between them be a few hours or many days, or whether the operators be the same or not.

Another object is an automatic device of the kind indicated of which the automatic features may be rendered temporarily inoperative and the device or a part thereof operated by hand.

Still another object is a device of the kind mentioned provided with means for indicating to the operator whether or not a particular controlled device is operating and in what condition it is at any moment.

With these and other objects in view the invention consists broadly in a control board provided with separate leads to any number of devices and a means for connecting one or more of these leads to a source of electric current, the connections being made and broken in accordance with a previously prepared record which may be a perforated strip of suitable material similar to those used in player pianos.

Reference is made to the accompanying drawings, in which:

Fig. 1 is an elevation of the device from the front.

Fig. 2 is a side view of the same on a larger scale.

Fig. 3 is a front view with the cover and certain other parts removed.

Fig. 4 is a vertical sectional view on line 4—4 of Fig. 1.

Fig. 5 is a front elevation of one of the rheostat operating motors.

Fig. 6 is a side elevation of the same.

Fig. 7 is a section on line 7—7 of Fig. 5.

Fig. 8 is a perspective view of one of the double roller contacts.

Fig. 9 is a similar view of a single roller contact.

Fig. 10 is a plan view of a portion of a "record".

Figure 11:
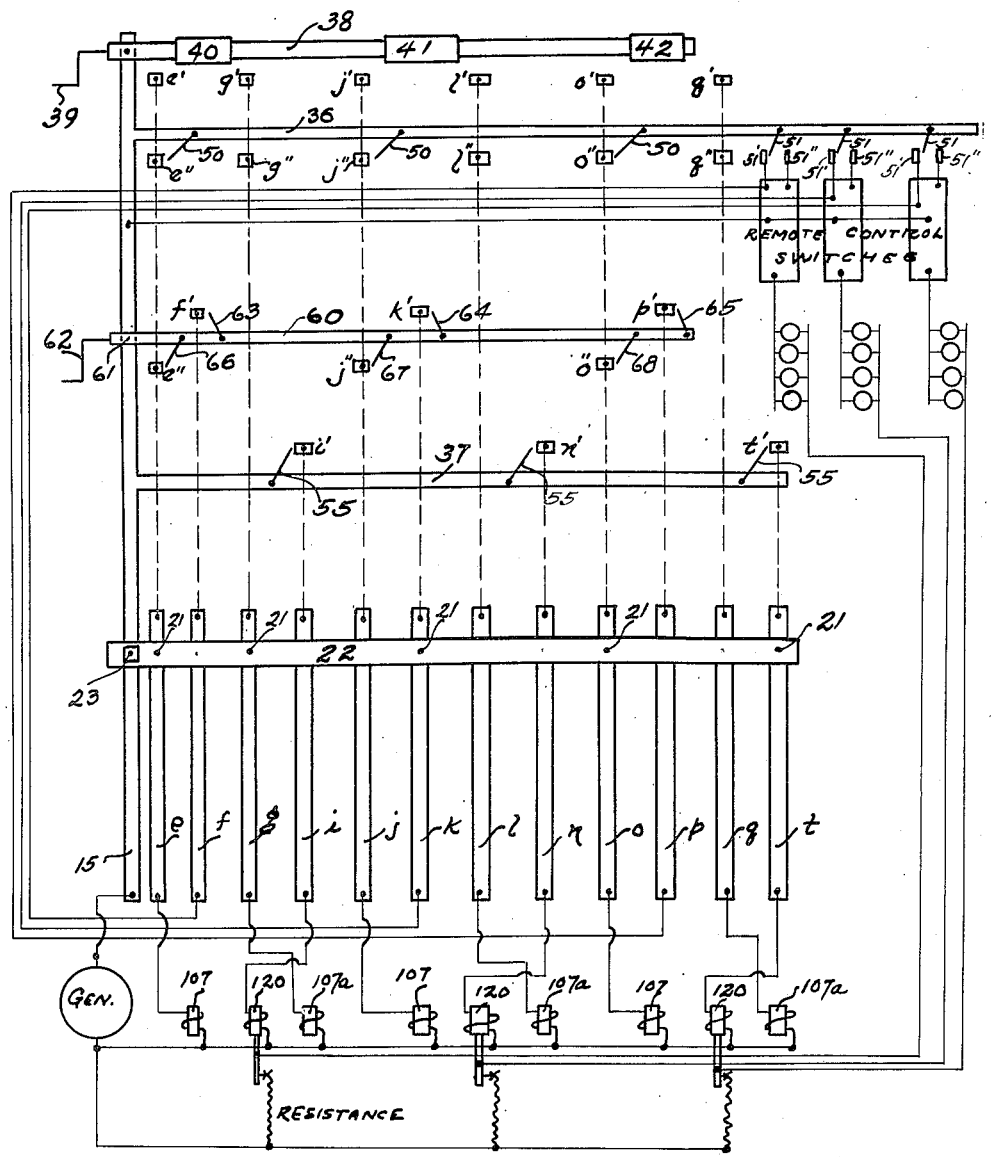
Fig. 11 is a diagrammatic view of the device, showing the wiring especially.

In the drawings, the device is shown as consisting of a fixed upright frame 10 and a hinged frame 11, the former carrying an insulating board 20 having mounted thereon, preferably upon the back thereof, a number of conducting bars lettered "a" to "u" and another bar numbered 15.

The hinged frame 11 carries two rolls 25 and 26 adapted to be rotated and to reel from one to the other a perforated strip 27 of suitable material, the perforations being in longitudinal rows after the fashion of piano player rolls, as indicated in Fig. 10, and the rows corresponding in number to the number of the bars lettered "a" to "u".

Frame 11 also carries, suitably insulated, a conducting bar 22 provided with a conducting finger 23, adapted, when the frame is closed to the full line position of Fig. 4, to contact with bar 15, but, when the frame is opened to the dotted line position, be spaced therefrom as indicated.

Electric current is led into the bar 15 and, when frame 11 is closed, passes through the finger 23 to bar 22 and from this bar is distributed to the bars "a" to "u", the connection with these being made by roller contact arms 21, contacting with the bar 22 through the perforations in the strip 27.

Each of the bars "a" to "u" is connected in suitable manner to an electrical device which it is wished to operate according to a predetermined schedule as represented by the perforated record strip. In the case of a theater installation, for example, certain bars will be connected to the house lights, certain of them will lead to signals in the dressing rooms, certain of them will control the curtain operating motors, and, as will be described more in detail certain of them will be connected to motors for operating dimming devices for the stage or other lights.

In the present instance, and using the form of motor to be described, the three dimming units will be connected to bars $e, g, i—j, l, n—$ and $o, q, t$. When, therefore, the "record" permits contact between the roller connected to one of these bars and the bar 22, the motor is correspondingly operated to give the desired dimming or brightening of the lights connected to the particular rheostat. In the form of motor shown, in order to move the rheostat through a considerable range, it is necessary to give it a series of impulses and therefore a series of makes and breaks of the circuit therethrough. Accordingly, the record will have a series of short perforations such as those bracketed at A. If a longer contact, for a bell signal for example, is desired, a longer perforation, such as B, is used with a single roller such as 21a. If a rapid series of short contacts is desired, a double roller 21 such as is shown in Fig. 8 is used, in order that the perforations need not come too close together. This is desirable when using a paper "record", in that the divisions may not tear. When the double roller is used for this purpose the distance between the rollers should be such that only one roller is in a perforation at any time. If a very long contact is desired, such as would correspond to several inches of record, it is desirable to leave tie pieces of the paper across such a hole. In such a case a double roller is also used but the rollers are placed far enough apart to span the tie pieces and so render the contact continuous. A continuous contact of this sort is indicated by the perforations bracketed at C.

For the purpose of operating the controlled devices in those cases where it is desired to modify the automatic scheduled control, or in case the automatic part of the device stops for any reason, or in case of other emergency, hand operation is possible through the installation shown in Fig. 3.

In this figure, showing the front of board or frame 20, there is shown a bar 35 connected to bar 15 and serving to supply current to the several means shown, bar 35 being connected to cross bars 36 and 37 as shown. The upper end of bar 35 is bent forward (see Fig. 4) and contacts with shaft 38, to one end of which is connected an operating crank 39 (Fig. 1).

Splined on shaft 38 are three double cams 40, 41 and 42, corresponding to the three rheostat motors. Cam 40 may be moved laterally to engage the spring contacts $e'$ or $g'$; cam 41 may be moved to engage $j'$ or $l'$; and cam 42 may be moved to engage $o'$ or $q'$, which lettered contacts are connected to the bars correspondingly lettered. The cams are moved by means of the levers 43, 44 and 45 and the levers may be moved individually by means of handles attached thereto or by means of a sliding bar 46 (see Fig. 1). This bar is provided with pegs 47 by means of which, at a single movement, the three levers may be set as desired. Rotation of shaft 38 then operates the motors through the periodical contact of the cams with the lettered contacts. Further, the motors may be operated by repeated movements of levers 50 which, being connected to "live" bar 36, may be swung either to the right or left to connect with contacts $e''$, $g''$, $j''$, $l''$, $o''$ and $q''$ which are also connected to bars $e, g, j, l, o$ and $q$ respectively.

The third row of levers 51 are connected to live bar 36 and are adapted to connect this bar with contacts 51' or 51'' which are connected to remote control switches adapted to make or break the light circuits through the rheostats, moving the lever to the right contacting 51' to make and moving the lever to the left contacting 51'' to break the circuit. These levers may be operated individually or they may be operated collectively by means of cross bar 52 carrying pegs 53 which serve to move the levers to the right or left or to center upon movement of the bar across and back.

The fourth row of levers 55 controls knife switches serving to connect live bar 37 to contacts $i'$, $n'$ and $t'$ in turn connected to bars $i, n$ and $t$. The latter are connected to the center solenoid of the motor as described later. These levers 55 may be moved individually or moved together by means of the cross bar 56.

Near the bottom of the device is mounted a rocking shaft 60 which is connected through its bearing 61 to live bar 35. This shaft may be operated by handle 62 and when lifted its contact fingers 63, 64 and 65 connect with contacts $f'$, $k'$ and $p'$ which lead to the remote control switch for the rheostat light circuits to turn on said switches. When the bar 60 is rocked the other way, the fingers 66, 67 and 68 touch contacts $e'''$, $j'''$ and $o'''$ in turn connected with bars $e, j$ and $o$ which lead to the rheostat motor and actuate it to brighten the lights. This operation is for emergency use in case it is desired to turn on all of the lights quickly. In such a case, the levers 55 are first thrown to the left to make their circuit and the bar 60 is rocked rapidly. This rocking first turns on all of those lights not already on and then brightens rapidly those not on full bright.

The automatic devices are operated by a motor 70 through gear box 71 having a clutch and reverse mechanism controlled by lever 72. If desired, different speeds may be obtained through suitable gearing controlled by lever 73.

From gear box 71 sprocket chain 74 leads to the upper reel 25 and serves to re-roll the record. The lower reel 26 may be geared directly.

Further, if desired, it is possible to insert in the circuits meters 75 to indicate the condition thereof and tell-tale lights 76 may also be used for these and other circuits controlled.

The particular motor used in the present device for operating rheostats for dimming and brightening certain lights is shown more in detail in Figs. 5, 6 and 7.

In these figures, the rheostat plate is shown at 100, with the contacts indicated at 101 and 102 with the contact arm at 103 rotatable about the center post 104. This arm is rotated by means of a yoke 105 carried on a toothed disc 106 which is in turn rotated by means of the solenoids 107 and 107a carried on a frame 108 which also carries the disc 106 upon shaft 109. Only one of these solenoids is energized at any given time and each rotates the disc in one direction only, solenoid 107 operating to increase the resistance of the rheostat and solenoid 107a operating to decrease the resistance thereof.

In order to move the disc 106, the solenoid 107 or 107a, when energized, pulls up its core 110, lifting a bar 111 which is pivotally attached to one arm 112 of a crank member pivoted on a cross arm 113, mounted on the same shaft as disc 106. The other arm 114 of the crank member is provided with several teeth 115 adapted to engage the teeth on disc 106. When, therefore, either solenoid is energized and lifts up on arm 112 of the crank member, the teeth thereon engage the teeth on the disc and further movement of the core 110 then carries the crank member with cross arm 113 and therefore disc 106 around shaft 109. Stops 116 may be provided to limit the movement of the cross arm 113 and therefore the movement of the disc 106 on each stroke.

If considerable movement of the rheostat is desired, the particular solenoid 107 or 107a is rapidly energized and de-energized to cause a succession of strokes to produce the movement desired.

If a very rapid and continuous movement of disc 106 is desired, the third solenoid 120 is energized and continued in this condition during the rapid movement. Energizing solenoid 120 causes it to lift its core 121 and through link 122 tilt the small frame piece 123 carrying in its upper end a shaft having fixed thereto a small flywheel 124 and a small gear 125. When the frame is tilted to the right (Fig. 7) the gear 125 meshes with the teeth on disc 106 and movement of the latter then imparts movement to the flywheel 124. The momentum of the latter will be sufficient to carry around the disc 106 in a continuous movement when being rapidly actuated by either solenoid 107 or 107a.

The three solenoids 107, 107a and 120 are in the present device connected to contact bars $e$, $g$ and $i$ respectively, and Figs. 1 and 3 indicate an installation wherein three such rheostat motors are controlled, the other two being controlled in like manner by the bars $j$, $l$ and $n$, and bars $o$, $q$ and $t$, respectively.

It should be noted that while three rheostat motor controls have been shown, any number may be used, and while a particular form of motor has been shown and described, other suitable forms may be substituted therefor.

The operation of the device will now be described.

Automatic control

When full automatic control is desired, frame 11 is swung forwardly on its pivot so that collector contact 23 will engage distributor bar 15 to energize distributor bar 22. The rolls 25 and 26 are rotated by the mechanism disclosed in Figs. 2 and 3 so that record 27 is fed over bar 22. At appropriate moments, in accordance with a predetermined selection, certain contacts 21 engage bar 22 and lead current therefrom to the bars $a$ to $u$ inclusive, from where they may be conducted to the various parts of the system thru several circuits.

The light circuits, for example, take their current from bars $f$, $k$ and $p$, and the path is thru the remote control switches (Fig. 11) to the load, returning the resistances (Fig. 11) to the generator (Fig. 11).

The rheostat motor circuits, for example, take their current from bars $e$, $g$, $i$, $j$, $l$, $n$, $o$, $q$, and $t$, and the path is thru the groups of solenoids 107, 107a, and 120, returning to the generator (Fig. 11).

Other circuits are not shown, their arrangement being unnecessary for the purposes of this description.

Full manual control

When, for any reason, full manual control is desired, frame 11 is swung rearwardly on its pivot so that the automatic devices including bar 22, record 27, etc., are no longer in operative connection with distributor bar 15. Shaft 38 may then be rotated so that current is led from bar 15 thru cams 40, 41, or 42, contacts $e'$, $g'$, $j'$, $l'$, $o'$, or $q'$, thru bars $e$, $g$, $j$, $l$, $o$, or $q$, to the rheostat motor solenoids 107, 107a, which operate to control the load resistance.

If desired, the motors may be operated more slowly by means of levers 50 on conducting bar 36, these levers bringing current from bar 15 thru bar 36, thru contacts $e''$, $g''$, $j''$, $l''$, $o''$ and $q''$, to the rheostat motor solenoids 107, 107$a$, which then operate to control the load resistance.

The light circuits, as contrasted with the rheostat motor circuits, are operable by means of levers 51 which bring current from live bar 36, thru contacts 51, thru the remote control switches (Fig. 11), thru the load, and thru the resistances to the return side of the generator.

The center solenoids of the rheostat motors are operated by means of levers 55 which bring current from bar 15 thru live bar 55, contacts $i'$, $n'$ and $t'$, thru bars $i$, $n$, and $t$ to solenoids 120.

All of the lights may be turned on, if they have not already been turned on, by means of the levers 63, 64, and 65 on the rocking shaft 60, these levers bringing current from bar 15, thru shaft 60, contacts $f'$, $k'$ and $p'$, bars $f$, $k$ and $p$, to the "make" side of the remote control switches.

Further, all of the dim lights may be quickly brought to "full bright" by levers 66, 67, and 68, which, when rocked by shaft 60, bring current from bar 15 thru shaft 60, levers 66, 67, and 68, contacts $e''$, $j''$, and $o''$, bars $e$, $j$, and $o$, to solenoids 107.

*Automatic and manual control*

When it is desired to modify the automatic control in any way, the latter may be caused to operate, as previously described, and during such operation, the manual controls may be operated, their operation in no way interfering with the automatically operating means except insofar as they place upon the circuits, conditions different from those placed thereupon by the automatic controls.

Having now described the invention and the preferred form of embodiment thereof, it is to be understood that the invention is not to be limited to the specific details herein described and shown but only by the scope of the claims which follow.

Claims—

1. A light control system for theater installations, comprising a plurality of lights, circuits for said lights, rheostats in the individual light circuits, automatic means for controlling the different light circuits in accordance with a predetermined schedule, said automatic means including also means for individually turning the rheostats to different positions in accordance with the predetermined schedule and manually operated means for making all of the light circuits effective and for turning all of the rheostats to full bright position.

2. A light control system for theater installations, comprising a plurality of lights, circuits for said lights, rheostats in the individual light circuits, controlling means for said rheostats to control their positions, circuits for said rheostat controlling means, automatic means for controlling the light circuits and the circuits for the rheostat controlling means in accordance with a predetermined schedule and manually controlled means for making all of said light circuits effective and for turning all of said rheostats to full bright condition.

3. A light control for theater installations, comprising a plurality of light circuits, rheostats in the individual light circuits, controlling means individual to each rheostat for controlling the amount of resistance of said rheostats included in the individual light circuits, circuits for said controlling means, automatic means for controlling the light circuits and the ciruits for the rheostat controlling means in accordance with a predetermined schedule and manually controlled means for also controlling said light circuits and for controlling the amount of resistance included by said rheostats in the individual light circuits.

4. A light control system for theater installations, comprising a plurality of lights, circuits for said lights, rheostats in the individual light circuits, circuit controlling means in said circuits, operating means for said rheostats, a frame having thereon a plurality of vertically arranged parallel conducting bars some of which are connected to the circuit controlling means and others to the rheostat operating means, means operating automatically in accordance with a predetermined schedule to supply current to selected ones of said bars at selected moments and manually controlled means for supplying current to selected ones of said bars in accordance with the desire of the operator.

5. A light control system for theater installations, comprising a plurality of lights, circuits for said lights, rheostats in the individual light circuits, circuit controlling means in said circuits, operating means for said rheostats, a frame having thereon a plurality of vertically arranged parallel conducting bars some of which are connected to the circuit controlling means and others to the rheostat operating means, means operating automatically in accordance with a predetermined schedule to supply current to selected ones of said bars at selected moments and manually controlled means for supplying current to selected ones of said bars in accordance with the desire of the operator, all of said current supplying means being disposed horizontally and transversely of said bars.

6. A light control system for theater installations, comprising a plurality of lights, circuits for said lights, rheostats in the individual light circuits, circuit controlling means in said circuits, operating means for said rheostats, a frame having thereon a plurality of vertically arranged parallel conducting bars some of which are connected to the circuit controlling means and others to the rheostat operating means, means operating automatically in accordance with a predetermined schedule to supply current to selected ones of said bars at selected moments and manually controlled means for supplying current to selected ones of said bars in accordance with the desire of the operator, said automatically operating means being disposed on one side of said frame and said manually controlled means being disposed on the other side of said frame.

7. A light control system for theater installations, comprising a plurality of lights, circuits for said lights, rheostats in the individual light circuits, circuit controlling means in said circuits, operating means for said rheostats, a frame having thereon a plurality of vertically arranged parallel conducting bars some of which are connected to the circuit controlling means and others to the rheostat operating means, means operating automatically in accordance with a predetermined schedule to supply current to selected ones of said bars at selected moments and manually controlled means for supplying current to selected ones of said bars in accordance with the desire of the operator, said automatically operating means being horizontally disposed on one side of said frame and said manually controlled means being horizontally disposed on the other side of said frame.

8. A light control system for theatre installations comprising a plurality of lights, circuits for said lights, rheostats in the individual light circuits, circuit controlling means in said circuits, operating means for said rheostats, a frame having thereon a plurality of vertically arranged parallel conducting bars some of which are connected to the circuit controlling means and others to the rheostat operating means, means operating automatically in accordance with a predetermined schedule to supply current to selected ones of said bars at selected moments and manually controlled means for supplying current to selected ones of said bars in accordance with the desire of the operator, the above mentioned frame being stationary, there being a movable frame at the rear of said stationary frame, and upon which the automatically operating means is mounted.

9. A light control system for theater installations comprising a plurality of lights, circuits for said lights, rheostats in the individual light circuits, circuit controlling means in said circuits, operating means for said rheostats, a frame having thereon a plurality of vertically arranged parallel conducting bars some of which are connected to the circuit controlling means and others to the rheostat operating means, means operating automatically in accordance with a predetermined schedule to supply current to selected ones of said bars at selected moments and manually controlled means for supplying current to selected ones of said bars in accordance with the desire of the operator, the above mentioned frame being stationary, there being a movable frame at the rear of said stationary frame, and upon which the automatically operating means is mounted, the two frames being hingedly connected to each other.

HARRISON J. L. FRANK.